United States Patent
Spear et al.

(10) Patent No.: US 7,879,310 B2
(45) Date of Patent: Feb. 1, 2011

(54) SILANES AS A SOURCE OF HYDROGEN

(75) Inventors: Scott K. Spear, Bankston, AL (US);
Daniel T. Daly, Tuscaloosa, AL (US);
Richard P. Swatloski, Tuscaloosa, AL (US); Raymond E. Paggi, Winchester, VA (US); Michael D. Redemer, Danville, CA (US)

(73) Assignee: Board of Trustees of the University of Alabama, Tuscaloosa, AL (US)

( * ) Notice: Subject to any disclaimer, the term of this patent is extended or adjusted under 35 U.S.C. 154(b) by 1156 days.

(21) Appl. No.: 11/497,638

(22) Filed: Aug. 2, 2006

(65) Prior Publication Data
US 2010/0255392 A1   Oct. 7, 2010

Related U.S. Application Data

(60) Provisional application No. 60/705,331, filed on Aug. 3, 2005.

(51) Int. Cl.
*C01B 3/02* (2006.01)
*H01M 8/06* (2006.01)

(52) U.S. Cl. .................... 423/648.1; 429/416

(58) Field of Classification Search .............. 423/627, 423/644, 648.1–658.3; 429/416–425
See application file for complete search history.

(56) References Cited

U.S. PATENT DOCUMENTS

| | | | | |
|---|---|---|---|---|
| 3,328,481 | A | * 6/1967 | Vincent | 525/477 |
| 3,673,115 | A | 6/1972 | Linsen et al. | 502/259 |
| 4,637,867 | A | 1/1987 | Herbst | 204/157.52 |
| 5,079,103 | A | 1/1992 | Schramm | 429/17 |
| 5,273,837 | A | 12/1993 | Aitken et al. | 429/30 |
| 5,306,578 | A | 4/1994 | Ohashi et al. | 429/27 |
| 5,328,779 | A | 7/1994 | Tannenberger et al. | 429/32 |
| 5,508,128 | A | 4/1996 | Akagi | 429/30 |
| 5,650,132 | A | 7/1997 | Murata et al. | 423/650 |
| 5,741,408 | A | 4/1998 | Helmer-Metzmann et al. | 13/8 |
| 5,840,270 | A | 11/1998 | Werth | 423/658 |
| 5,858,541 | A | 1/1999 | Hiraoka et al. | 428/429 |
| 6,060,026 | A | 5/2000 | Goldstein et al. | 422/186 |

(Continued)

FOREIGN PATENT DOCUMENTS

SU   1286506   4/1985

(Continued)

OTHER PUBLICATIONS

Harreld, John H. et al., Surfactant and pH-mediated Control over the Molecular Structure of Poly(phenylsilsesquioxane) Resins, 2002, Chem. Mater., 14, pp. 1174-1182.*

(Continued)

*Primary Examiner*—David M. Brunsman
*Assistant Examiner*—Kevin M Johnson
(74) *Attorney, Agent, or Firm*—McKeon Meunier Carlin & Curfman LLC

(57) ABSTRACT

Disclosed are compositions, methods, and devices that generally relate to silanes and silicides and to uses thereof for hydrogen generation. Methods and devices for generating hydrogen for fuel cells and for other applications such as fuel or a supplementary fuel for internal combustion engines and reducing agents to improve catalyst efficiency are also disclosed.

13 Claims, 10 Drawing Sheets

U.S. PATENT DOCUMENTS

| | | | |
|---|---|---|---|
| 6,080,503 | A | 6/2000 | Schmid et al. .................. 429/35 |
| 6,087,033 | A | 7/2000 | Grune et al. ................... 429/26 |
| 6,106,963 | A | 8/2000 | Nitta et al. ..................... 429/10 |
| 6,336,430 | B2 | 1/2002 | De Souza et al. ............... 123/3 |
| 6,348,278 | B1 | 2/2002 | LaPierre et al. ............... 429/17 |
| 6,399,235 | B1 | 6/2002 | Yen et al. ....................... 429/33 |
| 6,544,400 | B2 | 4/2003 | Hockaday .................... 205/338 |
| 6,572,837 | B1 | 6/2003 | Holland et al. ............ 423/648.1 |
| 6,582,676 | B2 | 6/2003 | Chaklader et al. ......... 423/648.1 |
| 6,733,916 | B2 | 5/2004 | Mizuno ........................ 429/30 |
| 7,037,484 | B1 | 5/2006 | Brandenburg ............. 423/648.1 |
| 2003/0215679 | A1* | 11/2003 | Reinke et al. .................. 429/13 |

FOREIGN PATENT DOCUMENTS

| | | |
|---|---|---|
| WO | WO2005/037421 | 4/2005 |
| WO | WO2006/013753 | 2/2006 |
| WO | WO2006/099716 | 9/2006 |
| WO | WO2007/054290 | 5/2007 |
| WO | WO2008/094840 | 8/2008 |
| WO | WO2009/023535 | 2/2009 |

OTHER PUBLICATIONS

Schubert, Ulrich and Catrin Lorenz, Conversion of Hydrosilanes to Silanols and Silyl Esters Catalyzed by [Ph3PCuH]6, 1997, Inorganic Chemistry, 36, pp. 1258-1259.*

International Search Report, PCT/US2006/030083, filing date Aug. 2, 2006.

Browning, Darren, "DERA Research on H2 storage and Generation Methods for Fuel Cells" Sep. 2006.

Hahn, John, "Hydrogen production from Biomass," dissertation, University of Missouri, p. 76-78, Dec. 2006.

Nath et al. "Hydrogen from Biomass" Current Science 85(3):267, 2003.

Neal et al. "Primary Reaction Channels and Kinetics of the Thermal Decomposition of Phenylsilane" Journal of Physical Chemistry 99:9397, 1995.

International Search Report for PCT/US08/052127, dated Oct. 16, 2008.

International Search Report for PCT/US08/072523, dated Apr. 2, 2009.

Bhandakar, "Modeling of Silicon Hydride Clustering In A Low-Pressure Silane Plasma," *J Phys D: Appl Phys*, 33:2731-2746, 2000.

Chernov et al., "Production of Hydrogen From Siloxene 1," *Zhurnal Prikladnoi Khimii*, 63(8):1802-6, 1990 (Translated).

Chung et al., "Nature of the Active Silane Alcoholysis Catalyst in the $Ru_wCl_x(CO)_y(PMe_3)_z$ (w, x, y, z=1 or 2) System; $Ru_2(\mu-Cl)_2Cl_2(CO)_4(PMe_3)_2$ as a New Catalyst for Silane Alcoholysis in a Polar Solvent," *Can J Chem/Rev Can Chim*, 79(5-6): 949-957, 2001.

Fargas et al., "Calorimetry of Hydrogen Desorption From a Si-Nanoparticle,", 2002.

Mitzel et al., "The Molecular Structures of Three Disilylbenzenes Determined in the Gas Phase, The Solid State, and *Ab Initio* Calculations," *Z. Naturforsch*. 57b:202-14, 2002.

Workshop Proceedings, "Hydrogen Storage and Generation," *Army Research Office and the Central Intelligence Agency*, 1997.

* cited by examiner

FIG. 6

| | Reactant Volume, ml | Reactant Density, g/ml | Reactant weight, g | Reactant moles | Catalyst | Catalyst weight, g | Total weight | Volume $H_2$ liberated, ml | Weight $H_2$ liberated, g | Moles $H_2$ liberated | Gravimetric efficiency | Moles hydrogen/Moles of silane |
|---|---|---|---|---|---|---|---|---|---|---|---|---|
| PS | 0.1 | 0.877 | 0.0877 | 0.000812 | NaOH | 0.04 | 0.1277 | 40 | 0.00356 | 0.001780 | 2.79% | 2.19 |
| PS | 0.2 | 0.877 | 0.1754 | 0.001624 | Pd Ac | 0.0935 | 0.2689 | 120 | 0.01068 | 0.005340 | 3.97% | 3.29 |
| PS | 0.1 | 0.877 | 0.0877 | 0.000812 | PdAc | 0.062 | 0.1497 | 37 | 0.003293 | 0.001647 | 2.20% | 2.03 |
| PS | 0.2 | 0.877 | 0.1754 | 0.001624 | CuAc | 0.173 | 0.3484 | 97 | 0.008633 | 0.004317 | 2.48% | 2.66 |
| PS | 0.2 | 0.877 | 0.1754 | 0.001624 | CuAc | 0.0467 | 0.2221 | 81 | 0.007209 | 0.003605 | 3.25% | 2.22 |
| PS | 0.2 | 0.877 | 0.1754 | 0.001624 | CuAc | 0.0894 | 0.2648 | 81 | 0.007209 | 0.003605 | 2.72% | 2.22 |
| DSB | 0.1 | 0.8 | 0.08 | 0.000889 | CuAc | 0.0762 | 0.1562 | 15 | 0.001335 | 0.000668 | 0.85% | 0.75 |
| DSB | 0.1 | 0.8 | 0.08 | 0.000889 | PdAc | 0.0394 | 0.1194 | 22 | 0.001958 | 0.000979 | 1.64% | 1.10 |
| DSB | 0.1 | 0.8 | 0.08 | 0.000889 | | 0 | 0.08 | 20 | 0.00178 | 0.000890 | 2.23% | 1.00 |
| DSB | 0.1 | 0.8 | 0.08 | 0.000889 | Hot H2O | 0 | 0.08 | 23 | 0.002047 | 0.001024 | 2.56% | 1.15 |
| Calcium silicide | | | 0.1758 | 0.001831 | | 0 | 0.1758 | 6 | 0.000534 | 0.000267 | 0.30% | 0.15 |

FIG. 9
A
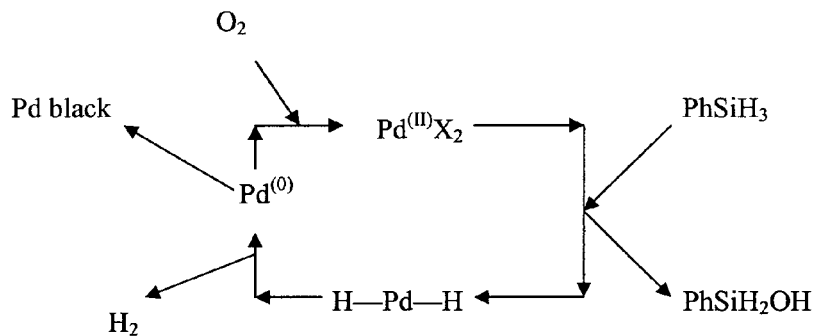
B
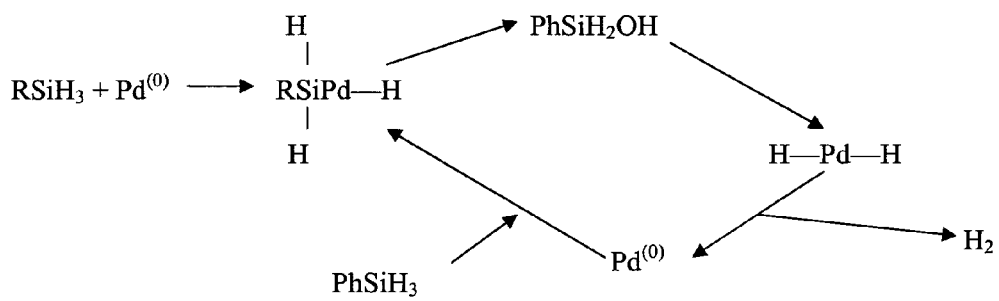
C
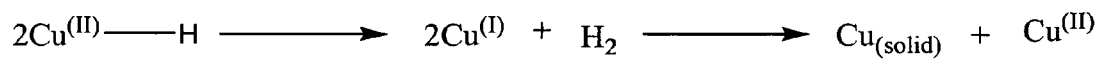

FIG. 10

$$CH_3(CH_2)_7NH_2 + H_2O \longrightarrow OH^- + CH_3(CH_2)_7NH_3^+ \quad (1)$$

$$PhSiH_3 + OH^- + CH_3(CH_2)_7NH_3^+ \longrightarrow PhSi(H_3)OH + H_2 + CH_3(CH_2)_7NH_2 \quad (2)$$

SILANES AS A SOURCE OF HYDROGEN

CROSS REFERENCE TO RELATED APPLICATIONS

This application claims the benefit of priority to U.S. Provisional Application No. 60/705,331, filed Aug. 3, 2005, which is incorporated by reference herein in its entirety.

FIELD

The subject matter disclosed herein generally relates to silanes and silicides and uses thereof to generate hydrogen. Methods and devices for generating hydrogen for fuel cells and for other applications such as fuel or a supplementary fuel for internal combustion engines and reducing agents to improve catalyst efficiency are also disclosed.

BACKGROUND

A fuel cell is a device that converts energy of a chemical reaction into electrical energy (electrochemical device) without combustion. A fuel cell generally comprises an anode, cathode, electrolyte, backing layers, and current collectors. Since the voltage of a typical fuel cell is usually small, they are often stacked in series. In such configurations, fuel cells can have 2-3 times greater efficiency than internal combustion engines.

There are several types of fuel cells, which are typically classified by their various electrolytes. One common type of fuel cell is a Proton Exchange Membrane (PEM) fuel cell. PEM fuel cells generally involve a solid organic polymer (e.g., polyperfluoro-sulfonic acid or NAFION®) as an electrolyte. They have high power density and can vary output quickly, which makes them desirable for portable and auto applications. PEM fuel cells are also known as polymer electrolyte fuel cells, polymer electrolyte membrane fuel cells (PEMFC), solid polymer electrolyte (SPE) fuel cells, and solid polymer membrane (SPM) fuel cells.

Fuel cells produce electricity, water, and heat using fuel and oxygen. The oxidation and reduction reactions occurring within a fuel cell are:

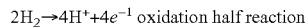
$2H_2 \rightarrow 4H^+ + 4e^{-1}$ oxidation half reaction

$4e^{-1} + 4H^+ + O_2 \rightarrow 2H_2O$ reduction half reaction

This electrochemical process is a non-combustion process that does not generate airborne pollutants. Water (liquid and vapor) is the only emission when hydrogen is the fuel. Therefore, fuel cells are a clean, low emission, and highly efficient source of energy that can use abundant and/or renewable fuels.

The two half-reactions normally proceed very slowly at the low operating temperature of a fuel cell. Specifically, kinetic performance of PEM fuel cells is limited primarily by the slow rate of the $O_2$ reduction half reaction (cathode reaction), which is more than 100 times slower than the $H_2$ oxidation half reaction (anode reaction). The $O_2$ reduction half reaction is also limited by mass transfer issues. Thus, catalysts are typically used on one or both the anode and cathode to increase the rates of each half reaction. Platinum (Pt) has been the most effective noble metal catalyst to date because it is able to generate high enough rates of $O_2$ reduction at the relatively low temperatures of the PEM fuel cells.

The catalysts used to induce the desired electrochemical reactions are often incorporated at the electrode/electrolyte interface by coating a slurry of the catalyst particles onto the electrolyte surface. When hydrogen or methanol fuel feed through the anode catalyst/electrolyte interface, an electrochemical reaction occurs, generating electrons and protons (hydrogen ions). The electrons, which cannot pass through the polymer electrolyte membrane, flow from the anode to the cathode through an external circuit containing a motor or other electrical load, which consumes the power generated by the cell. The protons generated at the anode catalyst migrate through the polymer electrolyte membrane to the cathode. At the cathode catalyst interface, the protons combine with electrons and oxygen to give water.

One major challenge for fuel cell development and commercialization has been the supply of fuel to the fuel cell. While hydrogen gas is generally the most efficient fuel, the use of hydrogen gas is complicated by storage concerns. For example, in order to supply significant amounts of hydrogen gas, especially for portable fuel cells, the hydrogen gas must be stored under pressure in specialized tanks. Such pressurized containers can add weight and complexity to a fuel cell apparatus, in addition to the costs associated with purifying and compressing hydrogen gas. Another concern regarding hydrogen gas is that it can easily ignite.

A Direct Methanol Fuel Cell (DMFC) is a popular type of PEM fuel cell that uses methanol for fuel. DMFC's are the only commercially available fuel cell units today. While DMFC's solve the hydrogen storage dilemma and perform well in the field, DMFC's suffer from lower cell voltages than are available with hydrogen gas fuel, and possess inherent toxicity and flammability difficulties. Also, the use of methanol (and fossil fuels in general) as fuel fails to eliminate carbon dioxide release, and they produce small levels of by-products that can poison the fuel cell and degrade performance. Furthermore, methanol fuels usually contain $H_2SO_4$ to facilitate oxidation of methanol and to provide ionic conductivity in the catalyst. The $H_2SO_4$ penetrates the anode structure providing ionic conductivity throughout the electrode, thus allowing most of the catalyst to be utilized resulting in improved performance. The use of $H_2SO_4$ is, however, undesirable due to sulfate species adsorbing onto the electrode surface and also the corrosive nature of the acid. Moreover, significant work has been undertaken by others to develop reformers to convert a variety of fossil fuels and other alcohols to hydrogen, but the weight burden and complexity of this approach is very large and has generally been rejected for automotive and small fuel cell applications.

In another approach, hydrogen fuel is stored in the form of metal hydrides, which release hydrogen gas to the fuel cell upon hydrolysis of the metal hydride. While the storage of hydrogen in metal hydrides overcomes the carbon dioxide issue, the maximum storage efficiency obtained thus far is about 4.0 wt. %. Other disadvantages of these systems are the necessity to carry water and, most importantly, the requisite use of expensive metal hydrides. Further, the metal hydrides are irreversibly hydrolyzed into metal hydroxides during hydrogen production. Thus, these systems require handling of metal hydroxide by-products, which are difficult, energy intensive, and costly to convert back to the original metal hydride form.

The United States Department of Energy (DOE) has identified hydrogen storage energy density as a critical requirement for the successful transition to the hydrogen economy. And to encourage efforts to overcome the challenges associated with hydrogen fuel, the DOE has established the hydrogen storage efficiency targets identified below.

|                                       | Year |      |      |
| ------------------------------------- | ---- | ---- | ---- |
|                                       | 2005 | 2010 | 2015 |
| Specific Energy kWh/kg                | 1.5  | 2.0  | 3.0  |
| kg H$_2$/kg System                    | 4.5  | 6.0  | 9.0  |
| Energy Density kWh/l                  | 1.2  | 1.5  | 2.7  |
| Gm H$_2$/l System                     | 36   | 45   | 81   |
| Storage System Cost $/kWh             | 6    | 4    | 2    |
| $/kg H$_2$ capacity                   | 200  | 133  | 67   |
| Refueling Rate kgH$_2$/min            | 0.5  | 1.5  | 2.0  |
| Loss of usable H$_2$ (g/hr)/kg stored | 1    | 0.1  | 0.05 |

The use of hydrogen as a sole fuel and as a supplementary fuel has been adopted by several engine manufacturers including Ford and BMW. The use of hydrogen can allow very lean combustion, which dramatically improves fuel economy and reduces harmful exhaust emissions. As a supplementary fuel, the use of hydrogen in amounts from about 1 to about 10% can facilitate the use of higher amounts of exhaust gas recirculation to reduce harmful emissions without incurring combustion instability. Hydrogen is also being pursued as an effective agent to enable the adoption of Lean NOx catalyst. The hydrogen can initiate catalytic reactions at lower temperatures, and has no carbon burden.

In light of the current difficulties with hydrogen generation and storage and the increasing need for a clean source of energy, new hydrogen generation and storage technologies for portable and stationary fuels cells are needed. Specifically desired are technologies that offer low pressure, high density storage of hydrogen and which overcome the efficiency, performance, and toxicity concerns of methanol, metal hydrides, and other hydrogen sources for fuel cells. The compositions, methods, and devices disclosed herein address these and other needs.

SUMMARY

In accordance with the purposes of the disclosed materials, compounds, compositions, articles, devices, and methods, as embodied and broadly described herein, the disclosed subject matter, in one aspect, relates to compounds and compositions, and to methods for preparing and using such compounds and compositions. In a further aspect, the disclosed subject matter relates to silanes and silicides and methods for using such silanes and silicides as a source of hydrogen fuel (e.g., for fuel cells). In a still further aspect, the disclosed subject matter relates to articles and devices (e.g., fuel cartridges and fuel cells) that involve silanes and silicides.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

FIG. 6 is a table showing the reaction conditions of various reactants and catalysts, and the hydrogen produced from the various reactions. In the table PS is phenylsilane and DSB is 1,3-disilabutane.

FIG. 9 is a group of schematics. FIG. 9A shows a proposed mechanism for the production of hydrogen from phenylsilane using a palladium catalyst. The reaction is dependant upon oxygen for producing the active species $Pd^{(II)}$. Further, there are no neutral ligands (e.g., chloride can be a ligand). FIG. 9B shows another proposed mechanism for the production of hydrogen from a silane where the active species is $Pd^{(O)}$ (e.g., with a low oxygen content). This mechanism can use neutral ligands on the palladium (e.g., phosphine or amine based ligands). FIG. 9C shows another proposed mechanism with a copper catalyst.

FIG. 10 is a proposed mechanism for the production of hydrogen from the reaction of phenylsilane with water using an n-octylamine catalyst.

DETAILED DESCRIPTION

Figure 1:
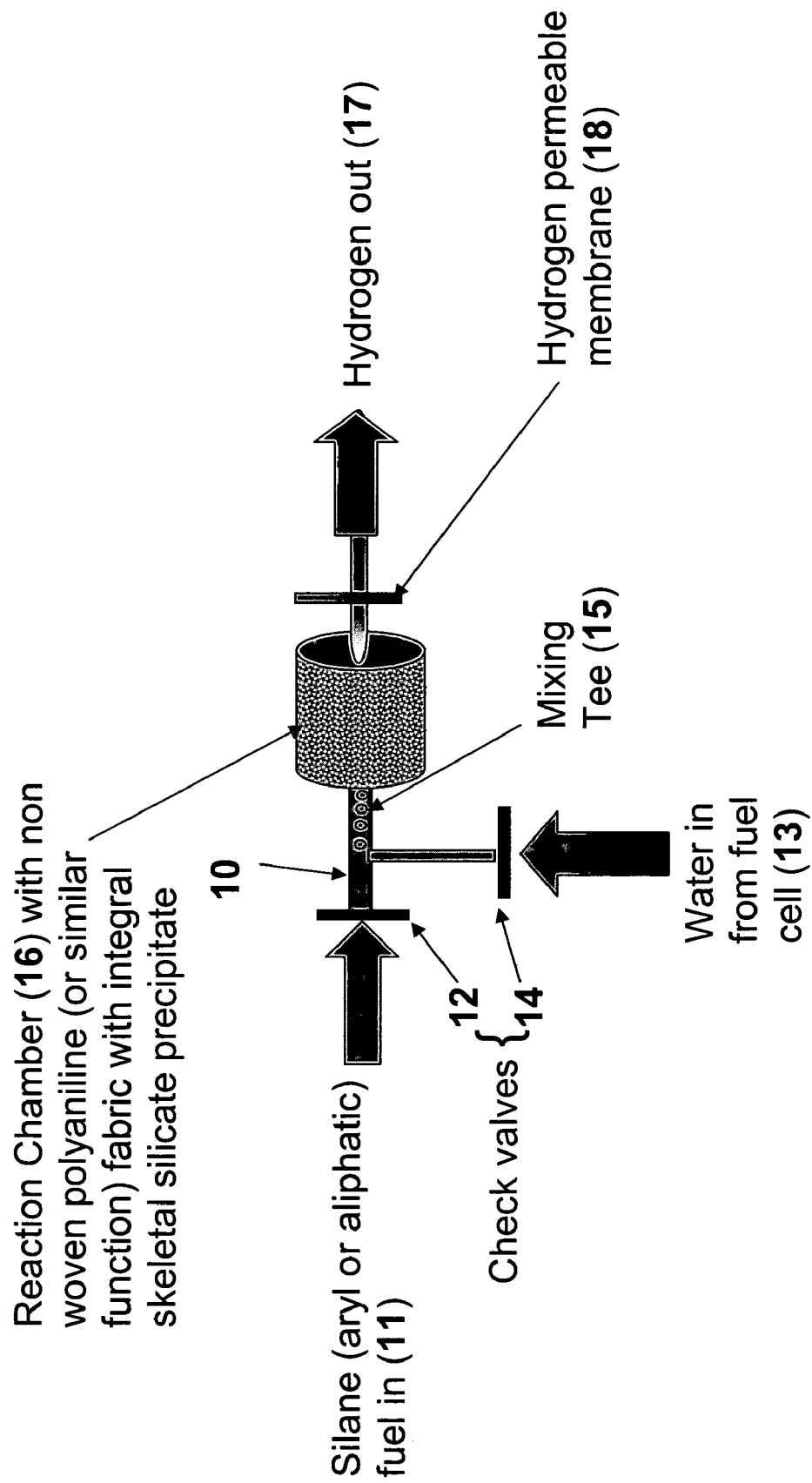
FIG. 1 is a schematic of a hydrogen generator according to one example of the disclosed subject matter where silane (e.g., aryl or aliphatic) is used as fuel.

The materials, compounds, compositions, articles, devices, and methods described herein may be understood more readily by reference to the following detailed description of specific aspects of the disclosed subject matter and the Examples included herein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

GENERAL DEFINITIONS

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an organosilane" includes mixtures of two or more such organosilanes, reference to "the silane" includes mixtures of two or more such silanes, and the like.

"Optional" or "optionally" means that the subsequently described event or circumstance can or cannot occur, and that the description includes instances where the event or circumstance occurs and instances where it does not. For example, statements about a device that optionally contains a check valve refers to devices that have a check valve and devices that do not have a check valve.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

CHEMICAL DEFINITIONS

As used herein, the term "substituted" is contemplated to include all permissible substituents of organic or inorganic compounds. In one example, the permissible substituents can include acyclic and cyclic, branched and unbranched, carbocyclic and heterocyclic, and aromatic and nonaromatic substituents of compounds. Illustrative substituents include, for example, those described below. The permissible substituents can be one or more and the same or different for appropriate compounds. For purposes of this disclosure, the heteroatoms, such as nitrogen, can have hydrogen substituents and/or any permissible substituents of organic or inorganic compounds described herein which satisfy the valences of the heteroatoms. This disclosure is not intended to be limited in any manner by the permissible substituents of compounds.

"$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkane" as used herein is a branched or unbranched saturated hydrocarbon group having the general formula of $C_nH_{2n+2}$ and can have from 1 to 40 carbon atoms, such as methyl, ethyl, n-propyl, isopropyl, n-butyl, iso-butyl, tert-butyl, pentyl, hexyl, heptyl, octyl, nonyl, decyl, dodecyl, tetradecyl, hexadecyl, eicosyl, tetracosyl, and the like. The alkane can also be cyclic, substituted, or unsubstituted, which are included within the meaning of the term "alkane." A cyclic alkane can specifically be referred to as a cycloalkane, but these structures are included within the meaning of the term "alkane." A radical of an alkane can be specifically referred to as an "alkyl," but throughout the disclosure alkyls are also intended to be included within the meaning of alkanes.

A "cycloalkyl" is a type of alkyl group and is included within the meaning of the word "alkyl." A cycloalkyl group is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a type of cycloalkyl group, and is included within the meaning of "alkyl" and "cycloalkyl," where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "alkoxy" as used herein is an alkyl group bound through a single, terminal ether linkage; that is, an "alkoxy" group can be defined as —$OA^1$ where $A^1$ is alkyl as defined above.

The term "alkene" as used herein is a hydrocarbon group of from 2 to 40 carbon atoms with a structural formula containing at least one carbon-carbon double bond. Asymmetric structures such as $(A^1A^2)C$=$C(A^3A^4)$ are intended to include both the E and Z isomers. This may be presumed in structural formulae herein wherein an asymmetric alkene is present, or it may be explicitly indicated by the bond symbol C=C. The alkene can also be cyclic, substituted, or unsubstituted, which are included within the meaning of the term "alkene." A cyclic alkene can specifically be referred to as a cycloalkene, but these structures are included within the meaning of the term "alkene." A radical of an alkene can be specifically referred to as an "alkenyl," but throughout the disclosure alkenyls are also intended to be included within the meaning of alkenes.

A "cycloalkenyl" is a type of alkenyl group and is included within the meaning of the word "alkenyl." A cycloalkenyl group is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group, and is included within the meaning of the terms "alkenyl" and "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "alkyne" as used herein is a hydrocarbon group of 2 to 40 carbon atoms with a structural formula containing at least one carbon-carbon triple bond. The alkyne can also be cyclic, substituted, or unsubstituted, which are included within the meaning of the term "alkyne." A radical of an alkyne can be specifically referred to as an "alkynyl," but throughout the disclosure alkynyls are also intended to be included within the meaning of alkynes.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. An aryl can also be substituted or unsubstituted, which are included within the meaning of the term "aryl." The term "biaryl" is a specific type of aryl group and is included in the definition of "aryl." "Biaryl" refers to two aryl groups that are bound together via a fused ring structure, as in naphthalene, or are attached via one or more carbon-carbon bonds, as in biphenyl.

The term "silane" as used herein is represented by the formula H—SiA$^1$A$^2$A$^3$, where A$^1$, A$^2$, and A$^3$ can be, independently, hydrogen, or a substituted or unsubstituted alkyl, alkoxy, alkenyl, alkynyl, aryl, heteroaryl, cycloalkyl, or cycloalkenyl. Generally, the term "silane" means a silicon analogue of an alkane, alkoxyl, alkene, alkyne, or aryl where one, more than one, or all carbon atoms in those structures are replaced by a silicon atom and at least one of the silicon atoms is covalently bonded to a hydrogen atom.

In some examples, a silane can be analog of an unsubstituted alkane and have the general formula of $Si_nH_{2n+2}$. Such structures are typically named according to regular nomenclature where the word "silane" is preceded by a numerical prefix (di, tri, tetra, etc.) for the number of silicon atoms in the molecule. Thus, $Si_2H_6$ is disilane, $Si_3H_8$ is trisilane, and so forth. There is usually no prefix for one, as $SiH_4$ is referred to as simply "silane." Silanes can also be named like any other inorganic compound; for example, silane can be named silicon tetrahydride, disilane can be named disilicon hexahydride, and so forth. Silanes that are substituted with a hydroxy group are called silanols.

In other examples disclosed herein, a silane can be substituted with one or more organic groups such as an alkane, alkene, alkyne, or aryl. Such structures, which contain a silicon-carbon bond, are typically referred to as organosilanes. Examples of some well known organosilanes include tert-butyldimethylsilane, trimethylsilane, phenylsilane, and the like. Silanes with more than one silicon atom can also be referred to as polysilanes.

Throughout this disclosure and the appended claims, the term "silane" is intended to include organosilanes, polysilanes, branched silanes, cyclic silanes, substituted silanes (e.g., silanols), and unsubstituted silanes, though in some instances these structures can be referred to specifically herein. Further, a radical of such a silane can be specifically referred to as a "silyl," but throughout the disclosure silyls are also intended to be included within the meaning of silanes.

The term "halide" as used herein refers to the halogens fluorine, chlorine, bromine, and iodine.

The term "hydroxyl" as used herein is represented by the formula —OH.

The terms "amine" or "amino" as used herein are represented by the formula NA$^1$A$^2$A$^3$, where A$^1$, A$^2$, and A$^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

Reference will now be made in detail to specific aspects of the disclosed materials, compounds, compositions, articles, and methods, examples of which are illustrated in the accompanying Examples and Figures.

Materials and Compositions

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C—F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Silanes and Hydrogen Production

Disclosed herein are compositions, and methods for their use, based on silane chemistry. The reaction of silanes with water (and alcohols) to evolve hydrogen is well known and contained in the literature (Pawlenko, Organosilicon Chemistry, Walter de Gruyter New York, 1986; Eaborn, Organosilicon Compounds, Butterworths Scientific Publications London 1960 and Xerox Microfilms Ann Arbor 1976, which are incorporated by reference herein at least for their teachings of silane and organosilicon reactions).

The hydrolysis reactions of silanes are strongly enthalpically driven. To illustrate, the bond energies of silanes are much lower as compared to hydrocarbons. The Si—Si bond is about 226 kJ/mole whereas the C—C bond is about 347 kJ/mole. The Si—H bond is about 318 kJ/mole whereas the C—H bond is about 414 kJ/mole. And, significantly, the Si—O bond is 464 kJ/mole, which is 146 kJ/mole higher in energy than the Si—H bond, whereas the C—I bond is 360 kJ/mole and lower in energy than the C—H bond. Thus, the hydrolysis of a silane, which involves breaking weak Si—H bonds to release H and forming strong Si—O bonds, is energetically favored. Conversely, the analogous reaction with carbon is energetically disfavored. This provides a fundamental advantage to silane chemistry in producing hydrogen because reformers, precious metals catalysts, and other hardware that add to the balance of plant weight and system complexity are, in many cases, not needed to promote the reactions that generate hydrogen.

Disclosed herein are compositions, methods, and devices that address issues related to the perceived hazardous character, low hydrogen density, and poor regeneration capability of silanes as fuel. For example, the compositions, methods, and devices disclosed herein can reduce or eliminate the need to provide separation or clean-up of the hydrogen from gaseous by-products. Also, the disclosed compositions, methods, and devices can provide pressure to eliminate or reduce the need for mechanical pumping and assist the fuel cell with its own pumping needs. Moreover, the disclosed compositions, methods, and devices do not result in the release of carbon dioxide (or any other gaseous pollutants) to the atmosphere. And, in most instances disclosed herein, a residual by-product is formed, but it is environmentally benign (i.e., sand).

In several examples disclosed herein, compositions comprising silanes can be used to generate hydrogen, which in turn can be used in (e.g., supplied to) a fuel cell or an internal combustion engine or a catalyst. The silanes, which react with water or alcohols under various conditions to produce hydrogen gas, are also disclosed herein and include for example organosilanes and polysilanes, as well as silanes or siloxenes produced from silicides.

Organosilanes

In many examples disclosed herein, the compositions, methods, and devices comprise organosilane. Some suitable examples of organosilanes comprise one or more silicon atoms bonded to one or more organic groups such as an alkane, alkoxy, alkene, alkyne, or aryl group. Specific examples of organosilanes include, but are not limited to, disilabutane, tetrasilyl ethylene, tetrasilyl methane, trisilyl methane, silyl acetylene, disilyl acetylene, tert-butyldimethyl silanes, trimethyl silane, and silyl substituted benzenes. Some specific examples of silyl substituted benzenes include, but are not limited to, silyl benzene (i.e., phenylsilane), disilyl benzene, trisilyl benzene, and hexasilyl benzene. The structures of such silyl benzenes are as follows.

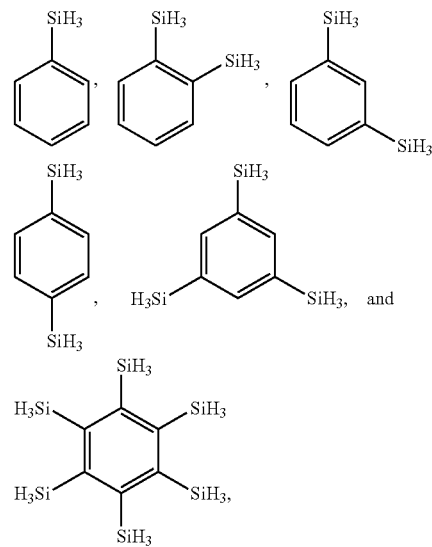

Many of the organosilanes disclosed herein, such as disilabutane and phenyl silane, are commercially available. Further, the disclosed organosilanes are often liquids at ambient temperature, are non-reactive when mixed with water, but reactive with water in the presence of a catalyst to produce hydrogen. That is, when exposed to a catalyst, an organosilane/water mix, as disclosed herein, can generate hydrogen at rates ranging from very slow to extremely rapid depending on the catalyst and the reaction conditions (temperature, stoichiometry, back pressure, etc).

To illustrate, phenylsilane reacts with water in the presence of a catalyst to produce a silanol, as shown in the following scheme.

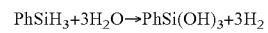

While not wishing to be bound by theory, proposed mechanisms for this reaction are shown in FIGS. 9A and B with a palladium catalyst and FIG. 9C with a copper catalyst. Copper(I) can be also used in the absence of $O_2$ to check for the disproportionation of copper in order to see if the active species is $Cu^{(I)}$ or $Cu^{(II)}$.

Organosilanes, as well as silanes, do not react with pure water or slightly acidified water under normal reaction conditions. However, in basic solution, a very rapid reaction occurs. Another proposed mechanism for the hydrolysis of phenylsilane involves an organic amine catalyzed reaction and is shown in FIG. 10. This mechanism involves first the reaction of the amine (e.g., octylamine) with water resulting in the formation of $OH^-$ anion and $CH_3(CH_2)_7NH_3^+$ cations. The $OH^-$ anion performs a nucleophilic attack on the Si—H bond to generate the Si—OH and release a $H^-$ anion which readily reacts with the $H^+$ cation in $CH_3(CH_2)_7NH_3^+$ to produce $H_2$ and the regenerated amine.

A theoretical gravimetric efficiency of 5.6% can be obtained when using all the water produced by the fuel cell. Under certain conditions, two silanols can dimerize and evolve an additional mole of hydrogen to yield an efficiency of 6.5%. Disilyl benzene with two silane groups per benzene ring is yet not commercially available but has been synthesized for research studies. It has a theoretical gravimetric efficiency of 8.7%. Disilabutane can react with water in the presence of a catalyst to yield six moles of hydrogen for a theoretical gravimetric efficiency of about 13%.

Organosilanes have high material gravimetric efficiencies, minimal safety issues, and the moderate pressures from the hydrogen evolvement can be utilized by a fuel cell for pumping.

Polysilanes

In some other examples, the compositions, methods, and devices can comprise a polysilane. Examples of suitable polysilanes include, but are not limited to, disilane, trisilane, tetrasilane, pentasilane, cyclopentasilane, hexasilane, cyclohexasilane, heptasilane, octasilane, nonasilane, decasilane, undecasilane, dodecasilane, tridecasilane, tetradecasilane, pentadecasilane, hexadecasilane, heptadecasilane, octadecasilane, nonadecasilane, icosasilane, henicosilane, doicosasilane, doicosasilane, triicosasilane, tetraicosasilane, pentaicosasilane, hexaicosasilane, heptaicosasilane, octaicosasilane, nonaicosasilane, triacontasilane, hentriacontasilane, dotriacontasilane, tritriacontasilane, tetratriacontasilane, pentatriacontasilane, hexatriacontasilane, heptatriacontasilane, octatriacontasilane, nonatriacontasilane, tetracontasilane, hentetracontasilane, dotetracontasilane, tritetracontasilane, tetratetracontasilane, pentatetracontasilane, hexatetracontasilane, heptatetracontasilane, octatetracontasilane, nonatetracontasilane, pentacontasilane, henpentacontasilane, dopentacontasilane, tripentacontasilane, tetrapentacontasilane, pentapentacontasilane, hexapentacontasilane, heptapentacontasilane, octapentacontasilane, nonapentacontasilane, hexacontasilane, henhexacontasilane, dohexacontasilane, trihexacontasilane, tetrahexacontasilane, pentahexacontasilane, hexahexacontasilane, heptahexacontasilane, octahexacontasilane, nonahexacontasilane, heptacontasilane, henheptacontasilane, doheptacontasilane, triheptacontasilane, tetraheptacontasilane, pentaheptacontasilane, hexaheptacontasilane, heptaheptacontasilane, octaheptacontasilane, nonaheptacontasilane, octacontasilane, henoctacontasilane, dooctacontasilane, trioctacontasilane, tetraoctacontasilane, pentaoctacontasilane, hexaoctacontasilane, heptaoctacontasilane, octaoctacontasilane, nonaoctacontasilane, nonacontasilane, hennonacontasilane, dononacontasilane, trinonacontasilane, tetranonacontasilane, pentanonacontasilane, hexanonacontasilane, heptanonacontasilane, octanonacontasilane, nonanonacontasilane, and hectasilane, including any combination or substituted derivatives thereof. Such polysilanes have high hydrogen density, which is beneficial for, for example, lightweight, portable, high power demand applications.

Such polysilanes are well known for their propensity to dehydrogenate in air and water and form $SiO_2$. $SiH_4$ and polysilanes up to $Si_3H_8$ are gases at room temperature and require special handling and high pressure cylinders for storage. However, polysilanes with four or more silicon atoms have low vapor pressures and are liquids at room temperature. Polysilanes with seven or more silicon atoms are no longer pyrophoric and are suitable silanes for hydrogen producing fuel.

The production of hydrogen gas with a polysilane (e.g., $Si_7H_{16}$), as shown in the following scheme generally require catalysts.

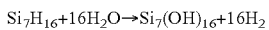
$Si_7H_{16}+16H_2O \rightarrow Si_7(OH)_{16}+16H_2$

If the Si—Si bonds in this example are broken by a catalyst to form seven silyl radicals, the hydrogen yield can improve from about 15% to about 21%. Further, UV light can quickly break Si—Si bonds to dehydrogenate and polymerize silanes. Using UV light in the presence of water can release all of the hydrogen on a polysilane and form harmless, amorphous $SiO_2$.

Silicides & Siloxenes

In still other examples, the disclosed compositions, methods, and devices can comprise silanes produced from silicides. For example, metal silicides ($M_2Si$, $MSi$, or $MSi_2$), where M is an alkaline, alkaline earth, or transition metal, can react with water to form silane ($SiH_4$) or siloxene ($Si_6H_6O_3$), which further reacts with water to produce hydrogen. Examples of suitable alkaline earth metals include magnesium, calcium, strontium, and barium. This two step reaction is illustrated in the following scheme with magnesium silicide, $Mg_2Si$.

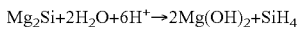
$Mg_2Si+2H_2O+6H^+ \rightarrow 2Mg(OH)_2+SiH_4$

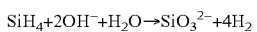
$SiH_4+2OH^-+H_2O \rightarrow SiO_3^{2-}+4H_2$

The gravimetric efficiency of this reaction is 10.42% if stoichiometric amounts of water are provided. If the only water available is the water effluent of the fuel cell, the theoretical efficiency drops to 7.6%. While alkaline earth metal silicides are abundant and stable, the caustic by-product (alkaline earth metal hydroxide) is generated, which requires careful handling.

Another example of this two step reaction involves the production of not a silane intermediate but a siloxene intermediate, and is illustrated in the following scheme with calcium silicide, $CaSi_2$.

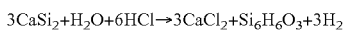
$3CaSi_2+H_2O+6HCl \rightarrow 3CaCl_2+Si_6H_6O_3+3H_2$

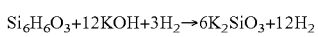
$Si_6H_6O_3+12KOH+3H_2 \rightarrow 6K_2SiO_3+12H_2$

Using a catalyst, the gravimetric efficiency of this reaction can be 9.9% if stoichiometric amounts of water are provided. If a catalyst is not used then the overall theoretical efficiency for this two-step reaction drops to 2.5%. While alkaline earth metal silicides are abundant and stable, the siloxene intermediate ($Si_6H_6O_3$) is generated, which may be air, water, and light unstable and possibly requires careful handling.

Devices

Also disclosed herein are devices or cartridges that can be used to convert silanes into hydrogen. The disclosed devices can also provide the hydrogen to a fuel cell; that is, the device can be connected to a fuel cell in a manner that facilitates the supply of hydrogen produced from the device to the fuel cell. The disclosed devices can, in some examples, feed the reactants on demand to a reaction zone. Further, the disclosed devices can blend the reactants in the desired concentrations, segregate the resulting hydrogen gas, and deliver the gas to the fuel cell. The disclosed devices can also contain a means for segregating and collecting the precipitate, refluxing clean water, and preventing backflow of reaction products into the reactant streams.

Organosilane Fueled Device

In one example, the device can be as shown in FIG. 1. The device comprises a mixing chamber (10) for mixing an organosilane and water. The mixing chamber (10) can comprise an inlet for the organosilane (11), with optional check valve (12), and a water inlet (13), also with optional check valve (14). In order to facilitate mixing of the organosilane and water, the mixing chamber can also contain a mixing device such as a stirrer or mixing tee (15).

Figure 2:
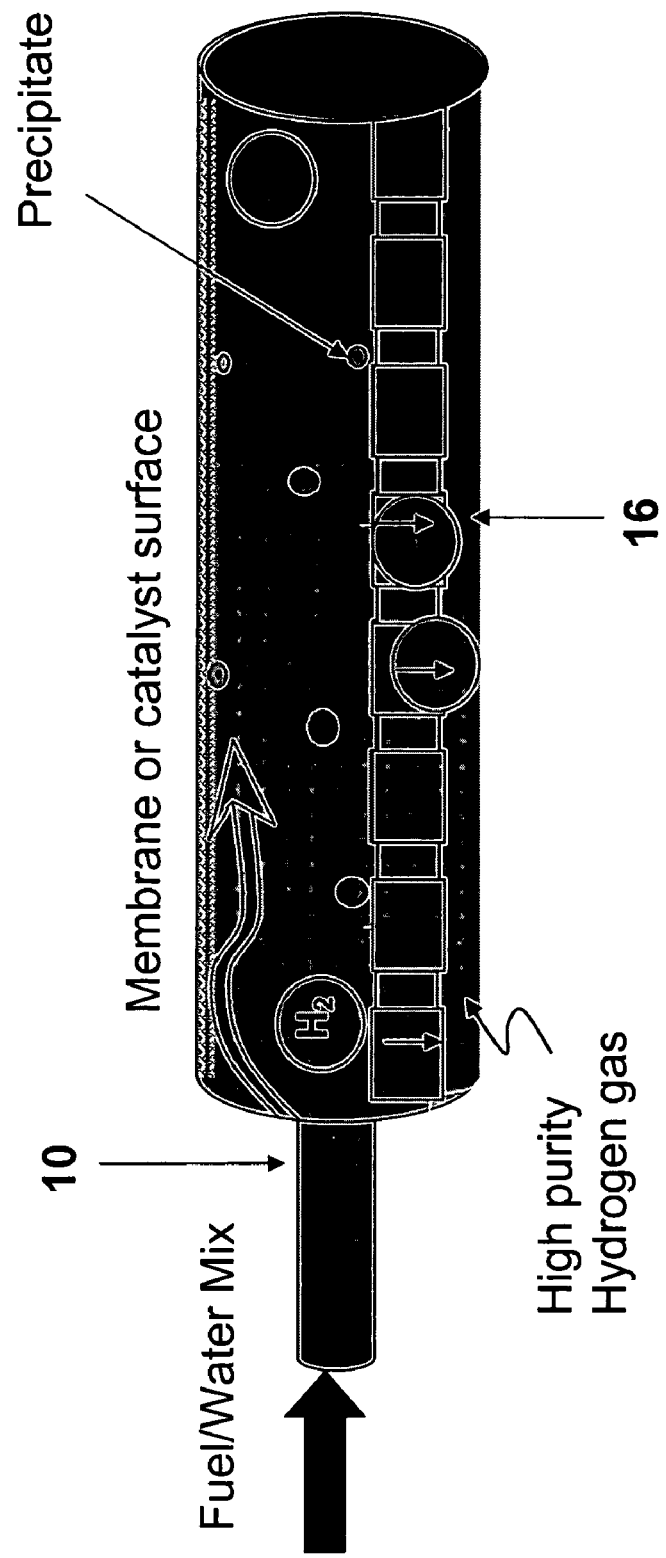
FIG. 2 is a schematic of a reaction chamber in the hydrogen generator shown in FIG. 1.

The device can also comprise a reaction chamber (16) (see FIG. 2) connected to the mixing chamber (10). The reaction chamber (16) can comprise a catalyst and an outlet for the hydrogen gas (17). The hydrogen outlet can comprise a hydrogen permeable membrane (18), which can allow the hydrogen to leave the device (e.g., be transported to the fuel cell) while containing any impurities.

The reaction chamber (16) can also comprise a silicate collector, which can be used to contain and/or remove the silicate by-product of the reaction. In some examples, the catalyst can comprise transition metals, base-functionalized and acid-functionalized membranes, non-woven fabrics, and amine functionalized dendrimers. Aerogels can also be used as a scavenger and polymerization site for the silanol product.

The catalyst that can be used in the reaction chamber can be any catalyst that can catalyze the production of hydrogen from an organosilane. Examples of suitable catalysts include, but are not limited to, compositions comprising scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, or ununbium. In some specific examples, the catalyst can comprises 10% Pd—C, Pd—Cu, Raney nickel, 5% Ru—C, $H_2PtCl_6$, $PdCl_2$, $PdOAc_2$, $CuOAc_2$, superacid membranes, phosphonic acid containing membranes, sulfonic acid containing membranes, and polymers along with alkaline membrane and polymers.

In some particular examples, the catalyst can be a nitrogen-containing catalyst, such as a soluble or insoluble amine. Examples of such nitrogen-containing catalysts include, but are not limited to, substituted or unsubstituted mono-, di-, and tri-alkyl amines, hydroxyalkylamines, substituted or unsubstituted mono-, di-, and tri-alkenylamines, and jeffamines, and substituted or unsubstituted imidazoles, benzimidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, and piperazines, including combinations thereof. Some specific examples include, but are not limited to, triethylamine (TEA), tributylamine, ethylbutylamine, hexylenediamine, N,N-dimethylethanolamine (DMEDA), dimethylaminoethanol (DMEA), triethylenediamine (TEDA), ethylenediamine tetraacetic acid (EDTA), N,N-dimethylcyclohexylamine, N,N'-dimethylaniline, N,N,N',N'-tetramethylethylenediamine (TMEDA), N,N,N',N'',N''-pentamethyldiethylenetriamine (PMDETA), pyridine, dimethylaminopyridine, benzyldimethylamine, tris-(dimethylaminomethyl)phenol, alkyl-substituted imidazoles (e.g., 1,2-dimethylimidazole), phenyl-substituted imidazoles, or bis(2-dimethylaminoethyl)ether (BDMEE). In one particular example, the catalyst is an alkyl amine, such as methylamine, ethylamine, propylamine, isopropylamine, butylamine, tert-butylamine, pentylamine, hexylamine, heptylamine, octylamine, nonylamine, decylamine, undecylamine, dodecylamin, tridecylamine, tetradecylamine, pentadecylamine, hexadecylamine, heptadecylamine, octadecylamine, nonadecylamine, icosylamine, henicosylamine, doicosylamine, triicosylamine, tetraicosylamine, and the like. A specific amine catalyst is octylamine. These amine catalysts can be used either alone or in combination. For example the amine catalyst can be used with a metal catalyst.

In some examples, a catalyst, such as an amine catalyst or metal disclosed herein, can produce hydroxide ions when contacted to an aqueous solution of organosilane. The generated hydroxide ion can then attack the silicon atom of the organosilane, releasing a hydrogen atom bonded to the silicon atom. When a metal catalyst is used, the metal can react with water to produce hydrogen in addition to the hydroxide ion, which, as noted, can react with the organosilane to produce hydrogen. In this instance, there can be two hydrogen producers in the system: the metal catalyst reacting with water to produce hydrogen, and the organosilane reacting with the in situ-produced hydroxide ion. Further, in these systems, the metal oxide by-product can be regenerated, for example, by using solar power.

Concentrated photovoltaics have been used to take metal oxides to their metal oxidation state. For example MgO or ZnO can be converted to Mg or Zn metal by the use of concentrated photovoltaic.

Thus it is envisioned that the source of hydrogen for these metal can be used as an initial stream of hydrogen and the hydroxide ion generated can be used as a catalyst in the silane reactions.

In such examples, while hydroxide ion can be produced in situ, it is not added (e.g., by adding sodium hydroxide) to the silane or water in the mixing chamber or reaction chamber. In other examples, hydroxide ion is not added as a reactant (e.g., in stoichiometric amounts, or in reactant amounts) to the silane or water but it can, in certain examples, be added in small amounts as a catalyst.

Experimental evidence disclosed herein has shown that phenylsilane will evolve up to 2 wt. % hydrogen at room temperature without any catalyst at a very slow rate (e.g., over 96 hours). With copper acetate as a catalyst, however, three times the mass of hydrogen is liberated upon mixing of the reactants at room temperature. No exothermicity was witnessed. And when octylamine was used as a catalyst, about 6.2 wt. % hydrogen was produced.

Polysilane Fueled Device

Figure 3:
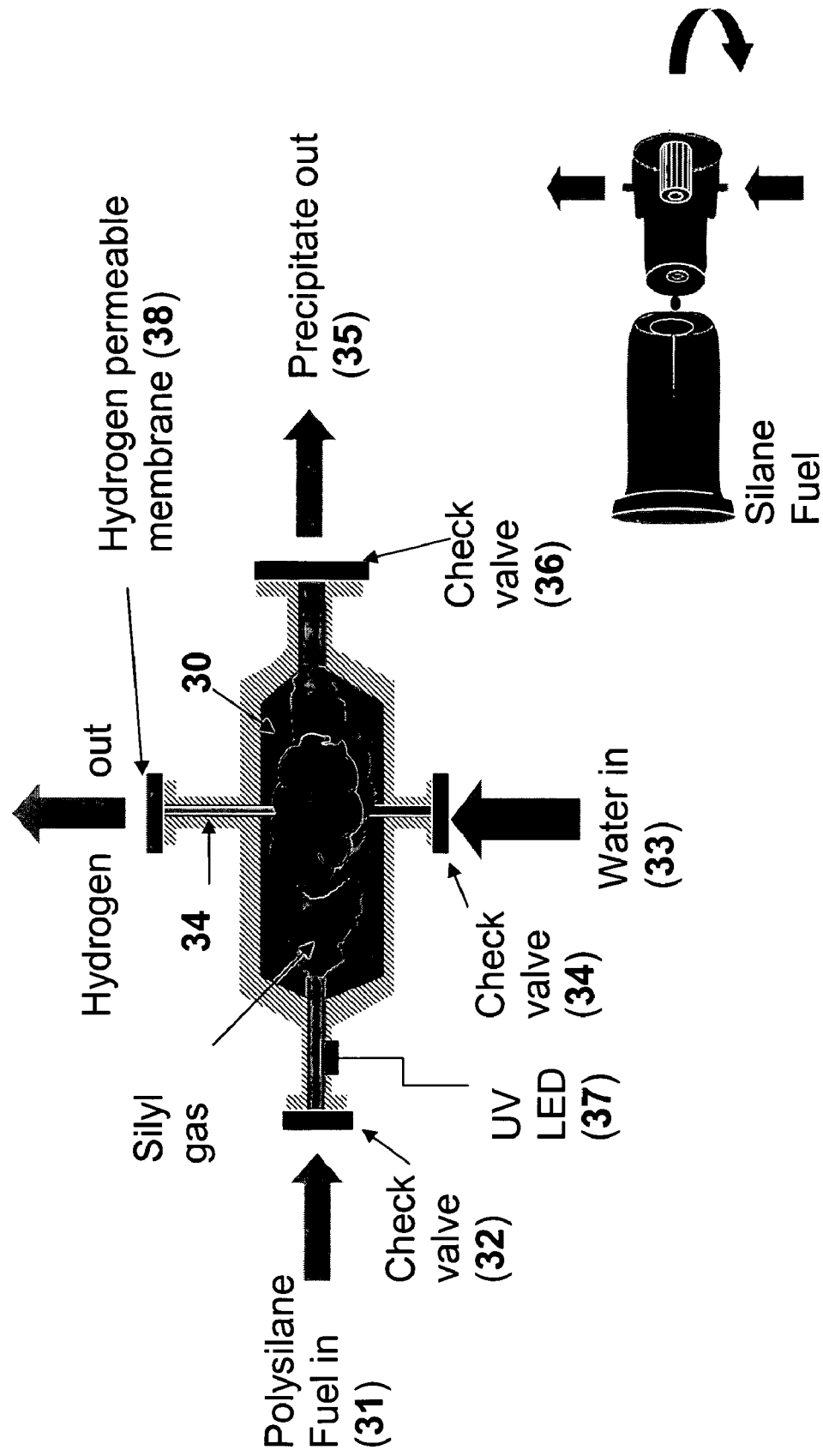
FIG. 3 is a schematic of a hydrogen generator according to another example of the disclosed subject matter where a polysilane is used as fuel.

In another example, the device can be as shown in FIG. 3. The device comprises a reaction chamber (30), with a polysilane inlet (31), with optional check valve (32), a water inlet (33), also with optional check valve (34), a hydrogen outlet (35), and an outlet (35) for a precipitate (e.g., $SiO_2$), again with optional check valve (36). As noted herein, polysilanes can be dehydrogenated with a UV light, so in one example, the polysilane inlet can contain a UV light source (37). Because polysilanes can produce a high rate of hydrogen release, a heavier gauge wall thickness can be used for the reaction chamber (30) in comparison to the organosilane device disclosed herein.

The polysilane fueled device can also have hydrogen permeable membrane (38) on the hydrogen outlet (34). Such a membrane can be used to purify the hydrogen gas emitted from the reaction. However, unlike the organosilane device disclosed above, where carbon based by-products can be produced, the use of polysilanes does not involve the production of such by-products and the hydrogen permeable membrane can, in many cases, be omitted. Further, because, separation of the precipitate produced from polysilanes is not as involved as with the organosilanes disclosed above, a precipitate discharge can be included.

Additionally, the polysilane fueled device can comprise a catalyst, such as any catalyst disclosed above for the organosilanes; although, this is optional.

Silicide Fueled Devices

Figure 4:
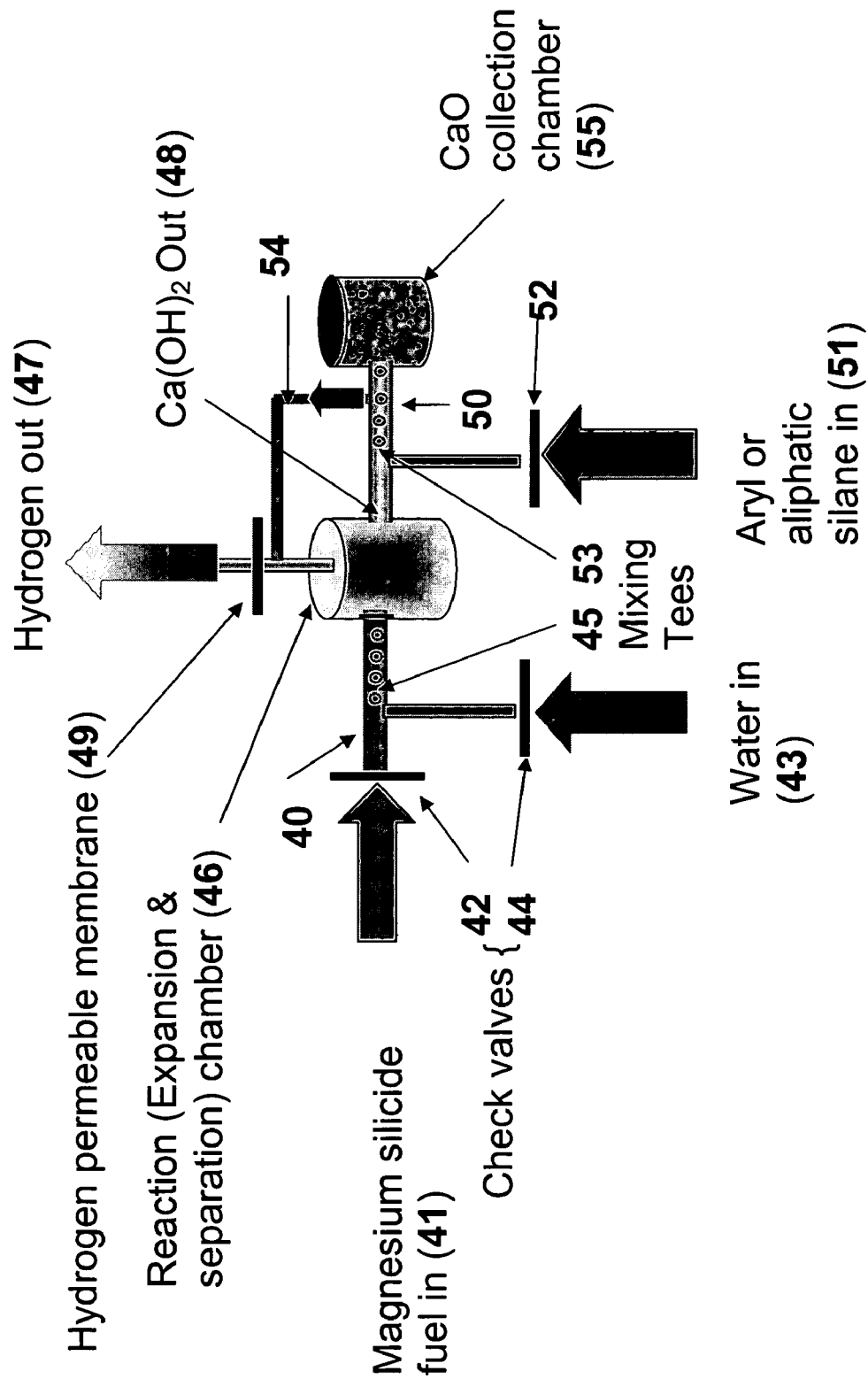
FIG. 4 is a schematic of a hydrogen generator according to yet another example of the disclosed subject matter where an alkaline earth metal silicide (shown in the figure as magnesium silicide) is used to produce hydrogen.

In this example, the device can be as shown in FIG. 4. The device involves a two fuel cartridge design where the by-product (e.g., alkaline earth metal hydroxide) can be used to initiate an organosilane reaction. In one aspect, the device comprises a first mixing chamber (40) for mixing an alkaline earth metal silicide and water. The first mixing chamber can comprise an alkaline earth metal silicide inlet (41), with optional check valve (42), and a water inlet (43), also with optional check valve (44). In order to facilitate mixing of the silicide and water, the first mixing chamber (40) can also contain a mixing device such as a stirrer or mixing tee (45).

The device also comprises a reaction chamber (46) connected to the first mixing chamber. The reaction chamber (46) can have a first hydrogen outlet (47) and an alkaline earth metal hydroxide outlet (48). As with the other devices disclosed herein, the first hydrogen outlet (47) can comprise a hydrogen permeable membrane (49).

The alkaline earth metal hydroxide outlet (48) can be connected to a second mixing chamber (50). This second mixing chamber (50) can be used to mix the alkaline earth metal hydroxide and a silane. As such, the second mixing chamber (50) can comprise a silane inlet (51), with optional check valve (52). As with the first mixing chamber (40), the second mixing chamber (50) can also contain a mixing device such as a stirrer or mixing tee (53) to mix the alkaline earth metal hydroxide and silane.

In some examples, the second mixing chamber (50) can comprise a second hydrogen outlet (54), which can also comprise a hydrogen permeable membrane (not shown). This second hydrogen outlet (54) can also be connected to the first hydrogen outlet (47). The second mixing chamber (50) can be connected to an alkaline earth metal oxide collection chamber (55).

Figure 5:
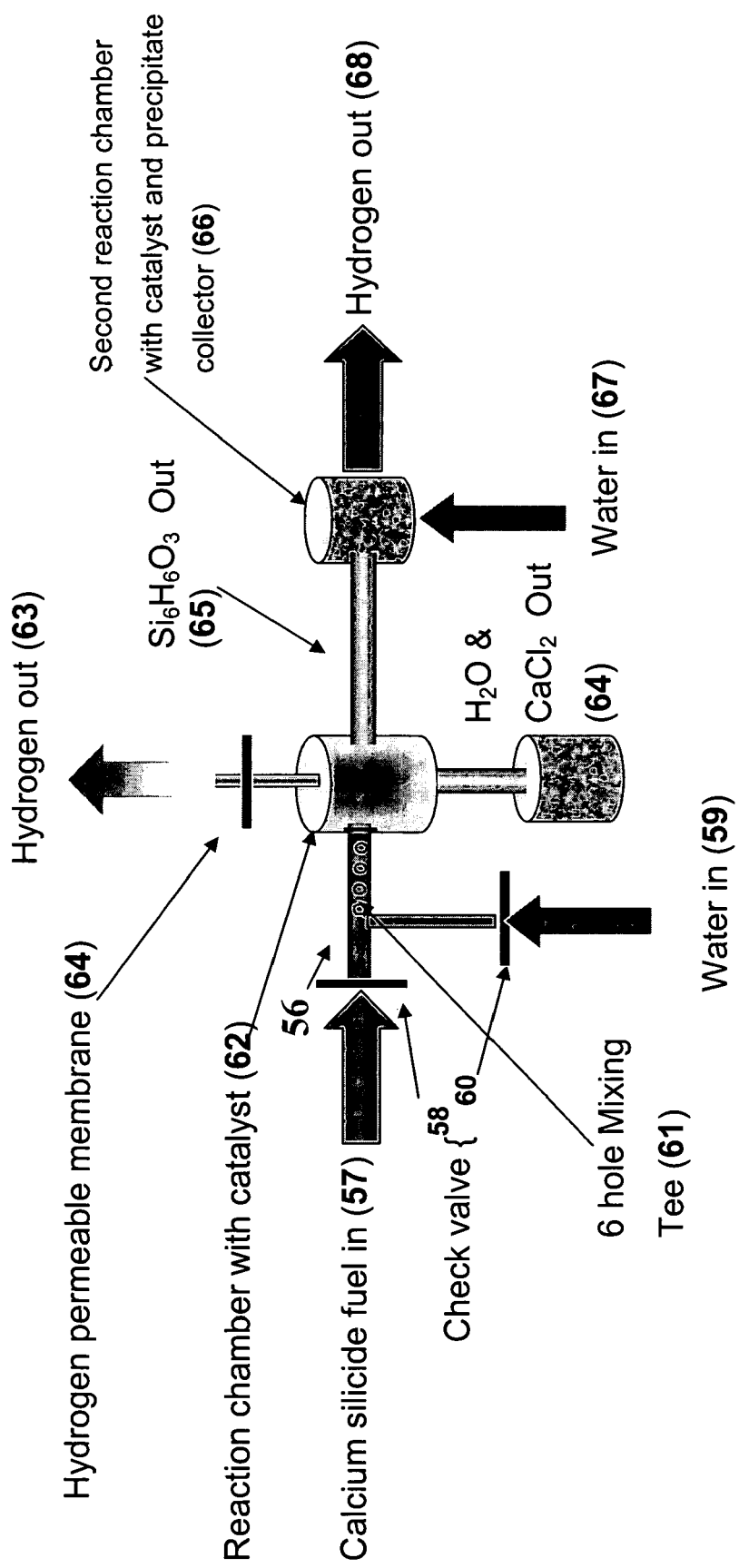
FIG. 5 is a schematic of a hydrogen generator according to yet another example of the disclosed subject matter where an alkaline earth metal silicide (shown in the figure as calcium silicide) is used to produce hydrogen.

In still another example, the device can be as shown in FIG. 5. The device involves a two fuel cartridge design where the by-product (e.g., siloxene) is used to initiate a second hydrogen production reaction. The device comprises a first mixing chamber (56) for mixing an alkaline earth metal silicide and water. The first mixing chamber can comprise an alkaline earth metal silicide inlet (57), with optional check valve (58), and a water inlet (59), also with optional check valve (60). In order to facilitate mixing of the silicide and water, the first mixing chamber (56) can also contain a mixing device such as a stirrer or mixing tee (61).

The device also comprises a reaction chamber (62) connected to the first mixing chamber. The reaction chamber (62) can have a first hydrogen outlet (63) and an alkaline earth metal salt outlet (64). As with the other devices disclosed herein, the first hydrogen outlet (63) can comprise a hydrogen permeable membrane (64).

The siloxene outlet (65) can be connected to a second reaction chamber (66) to mix the siloxene with catalyst. The second reaction chamber (66) can comprise a water inlet (67) and a second hydrogen outlet (68) which can also be connected to the first hydrogen outlet (63).

Also disclosed herein are fuel cells comprising a hydrogen source, wherein the hydrogen source comprises any of the devices disclosed herein.

Methods of Making Silanes

Many of the silanes that can be used in the compositions, methods, and devices disclosed herein are commercially available; for example, disilabutane and phenylsilane are both commercially available. Although other silanes disclosed herein are not commercially available, the synthesis of silanes is well documented in the literature and can be conducted according to established synthesis procedures. Some specific synthetic strategies for various silanes are provided herein.

Organosilanes

For example, disilyl acetylene can be prepared according to the following scheme.

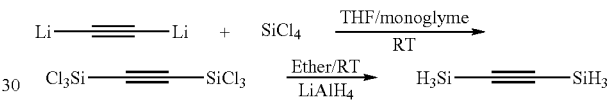

In this scheme, lithium acetylide, which can be obtained by treating acetylene with a strong base such as lithium hydride, butyl lithium, or lithium di-isopropylamide (LDA), is treated with silicon tetrachloride in THF/monoglyme at room temperature. The resulting chlorosilyl acetylene is then reduced with lithium aluminum hydride to provide the disilyl acetylene. A similar strategy can be used to produce the monosilylated acetylene.

Tetrasilyl methane and trisilyl methane can be prepared via similar synthetic routes, such as that shown in the following scheme.

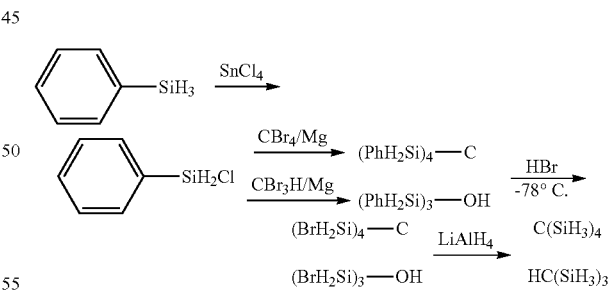

Here, the syntheses begin with commercially available phenylsilane, which is converted to the intermediate phenyl chlorosilane upon treatment with tin chloride. To prepare tetrasilyl methane, the phenyl chlorosilane intermediate is treated with carbon tetrabromide in the presence of magnesium. Similarly, to prepare trisilyl methane, the phenyl chlorosilane intermediate is treated with bromoform in the presence of magnesium. The resulting phenylsilylated species can be treated with hydrobromic acid, and then reduced with lithium aluminum hydride to yield the respected silyated methanes.

Another route to tetrasilyl methane begins with the reactive species $C_{1-4}$, which when treated with bromosilane, produces tetrasilyl methane. Similar procedures using bromosilane and a lithiated carbanion can be followed to produce disilyl acetylene and tetrasilylethylene, for example.

Disilyl and trisily benzenes can also be prepared according to analogous synthetic routes. One route to such compounds is illustrated in the following scheme.

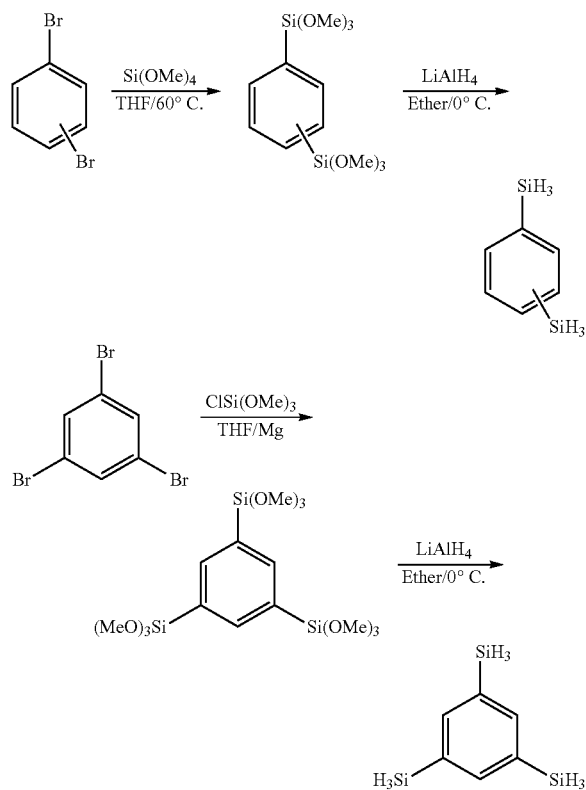

In this scheme, commercially available dibromobenzene is treated with tetramethoxy silane and then reduced with lithium aluminum hydride to provide the disilyl benzene. Treatment of the tribromo benzene with trimethoxy chlorosilane and subsequent reduction provides the trisilyl benzene.

Preparation of the hexasilyl benzene species can be obtained by the following strategy.

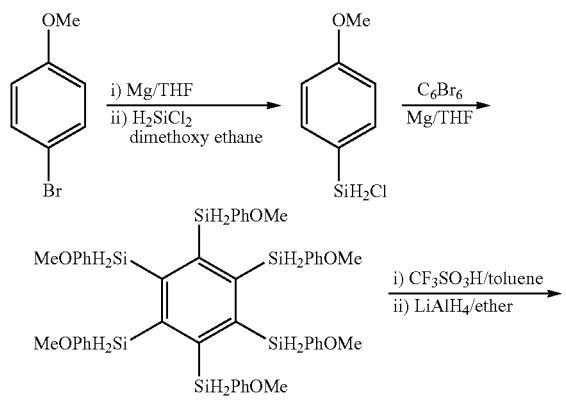

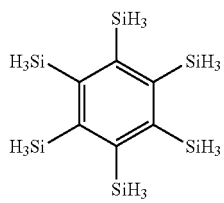

Here, commercially available 4-bromo anisole is converted to its corresponding Grignard reagent and then treated with dichlorosilane. The resulting chlorosilyl anisole is then contacted to the Grignard prepared from hexabromobenzene. This produces a hexasilylanisole benzene intermediate, which upon treatment with triflic acid (trifluoromethylsulfonic acid) and reduction with lithium aluminum hydride yields hexasilyl benzene. Another route to hexasilyl benzene involves the treatment of hexachlorobenzene with a strong base such as butyl lithium and bromosilane.

Polysilanes

Several polysilanes that are suitable for the disclosed compositions, methods, and devices are not commercially available. However, polysilanes have been extensively studied for their use in micro-chip manufacturing and various synthetic pathways have been reported (e.g., see Sandia, National Laboratories, "Environmentally Friendly Polysilane Photoresists," Bech, Loy, Hsiao, Waymouth, 1997). These researchers have shown that UV light from a mercury vapor lamp can quickly break the Si—Si bonds to dehydrogenate and polymerize silanes for use in chemical vapor deposition.

Silicides

Silanes and siloxenes can be prepared from alkaline, alkaline earth, and transition metal silicides as disclosed herein. Alkaline earth metal silicides are commercially available in bulk quantities as they are commonly used in the steel industry.

Fuel Cells

As described herein, the disclosed compositions, methods, and devices can be used to generate hydrogen. As such, they can be used as a source of hydrogen fuel for fuel cells. Generally, the disclosed compositions, methods, and devices can be used to supply hydrogen to any type or design of fuel cell that uses hydrogen as fuel. One of skill in the art will recognize that there are many ways to supply the hydrogen gas produced by the disclosed compositions, methods, and devices to a fuel cell. For example, the hydrogen outlet of any of the disclosed device (e.g., hydrogen outlet 17 in FIG. 1, hydrogen outlet 34 in FIG. 3, one or both hydrogen outlets 47 and 54 in FIG. 4, and one or both hydrogen outlets 63 and 68 in FIG. 5) can be connected to a fuel cell in such a way that the hydrogen produced from the disclosed device is supplied to an electrode of the fuel cell. Such a configuration can be replicated so as to supply hydrogen to the electrodes of more than one fuel cell (e.g., as is the case with stacks of fuel cell). In other examples, the hydrogen outlet of any of the disclosed devices can be connected to a reformer of fuel cell (or to several reformers of multiple fuel cells). A reformer is a component of a fuel cell where hydrogen gas (or some other fuel) is reformed with steam or oxygen to produce a "fuel gas," which is then fed to an electrode of a fuel cell for power generation. It is also contemplated that the connection between the hydrogen outlet of the disclosed devices and a fuel cell (or fuel cell reformer) can also be fitted with a valve or pump to control the amount (e.g., volume or pressure) of hydrogen that enters the fuel cell or fuel cell reformer.

The production of fuel cells is known in the art. For example, a fuel cell can be produced as described in U.S. Pat. Nos. 6,733,916, 6,399,235, 6,348,278, 6,106,963, 6,087,033, 6,080,503, 5,328,779, 5,273,837, 5,741,408, 5,508,128, 5,079,103, which are all incorporated by reference herein at least for their teachings of fuel cell fabrication and manufacture.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

Figure 7:
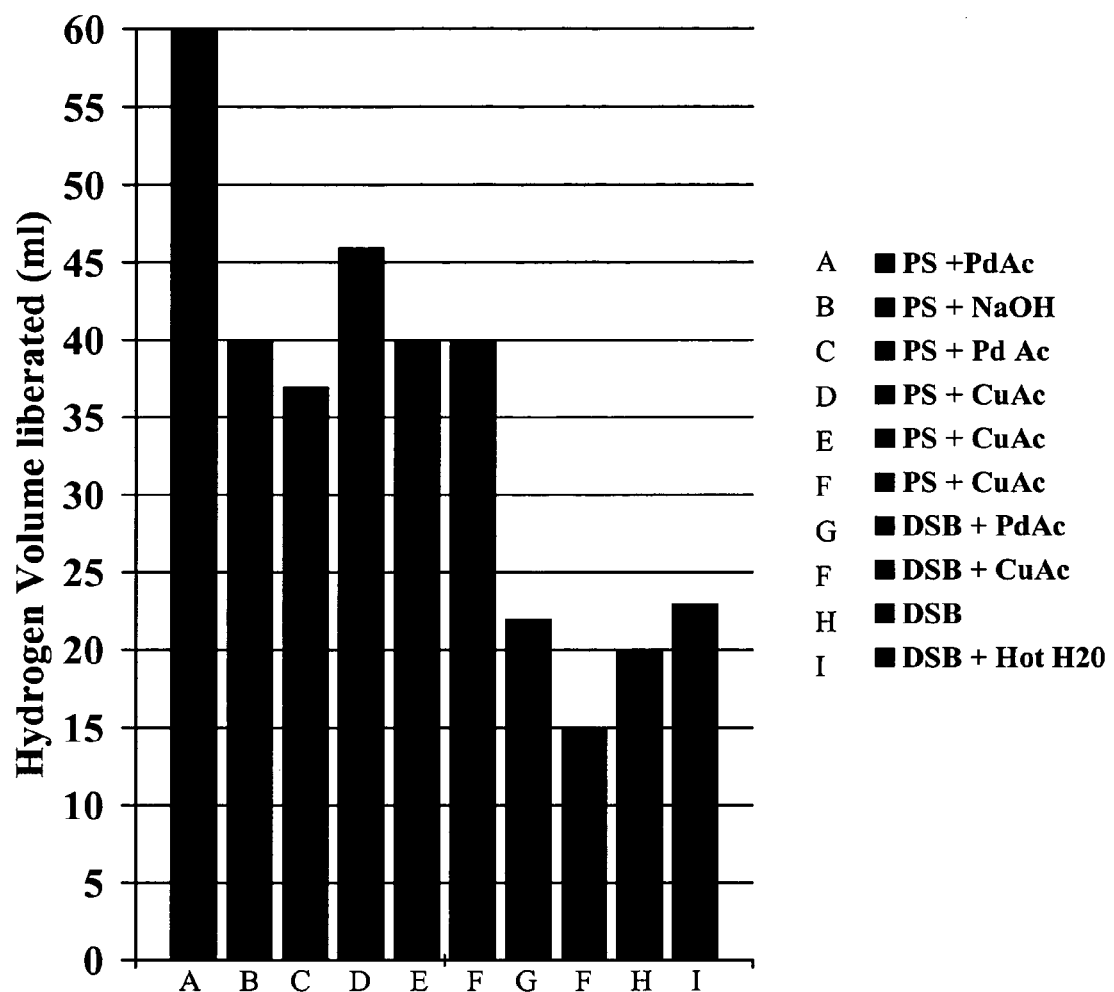
FIG. 7 is a graph showing the hydrogen volume liberated (mL) for phenylsilane (PS) and disilabutane (DSB) under various conditions.
Figure 8:
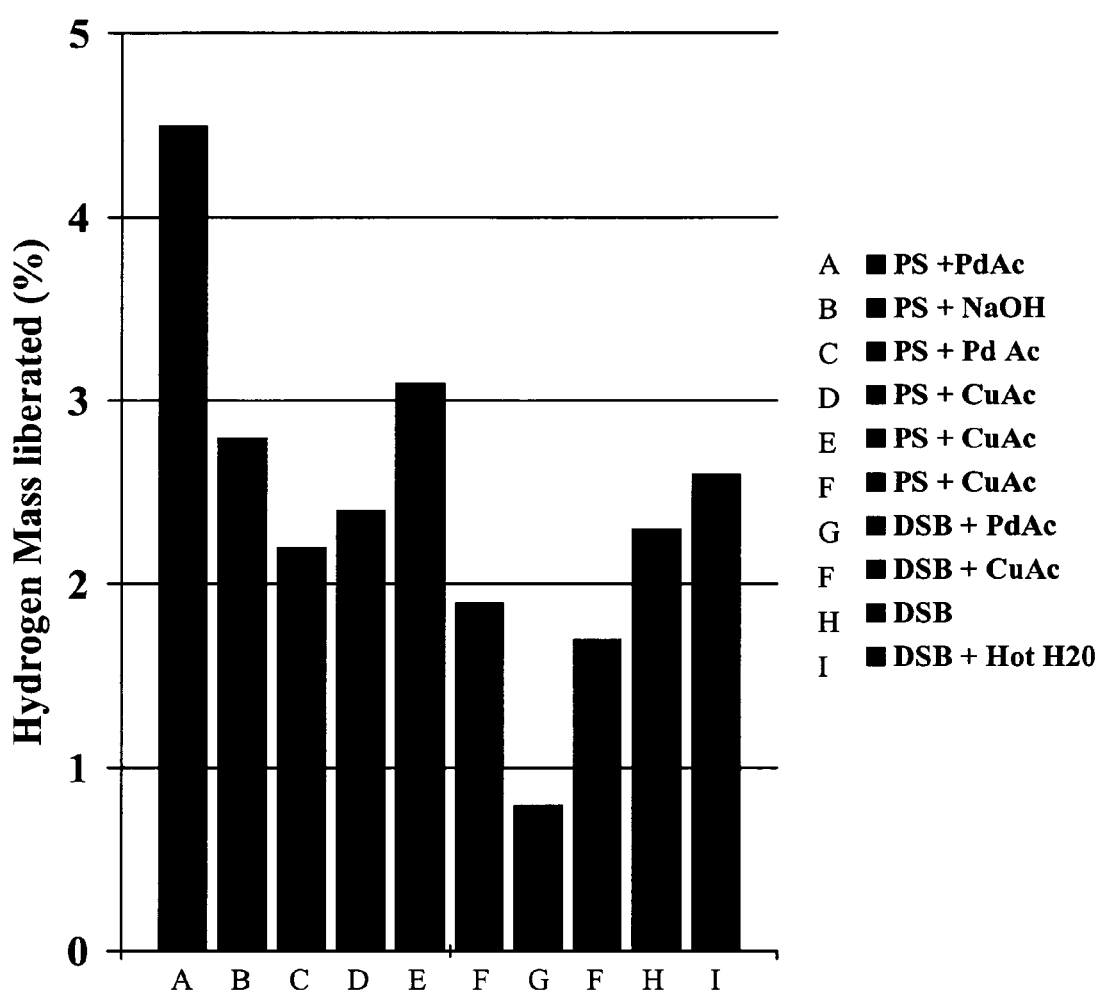
FIG. 8 is a graph showing the hydrogen mass liberated (%) for phenylsilane (PS) and disilabutane (DSB) under various conditions.

Reactants were added by syringe to a mixture of water, reagent, and catalyst in amounts shown in FIGS. 6-8. The gas evolved was collected in a graduated cylinder and quantified as displaced volume of water at atmospheric pressure. The amounts of hydrogen liberated are shown in FIGS. 6-8. The catalyst can be pre-mixed with the organosilane to produce the same effect.

Example 2

Water and HCl were added to $CaSi_2$ to create one mole of the siloxene, 3 moles of $CaCl_2$ and 12 moles of hydrogen. KOH and water was then added to the siloxene to generate the 12 additional moles of hydrogen and 6 moles of potassium silicate.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A method of generating hydrogen for a fuel cell, comprising contacting water and silane with an amine catalyst, wherein the silane is converted into hydrogen and a silicate, and supplying the hydrogen to the fuel cell.

2. The method of claim 1, wherein hydroxide is not added to the water or silane.

3. The method of claim 1, wherein the catalyst comprises substituted or unsubstituted mono-, di-, and tri-alkyl amines, hydroxyalkylamines, substituted or unsubstituted mono-, di-, and tri-alkenylamines, jeffamines, or substituted or unsubstituted imidazoles, benzimidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, or piperazines.

4. The method of claim 1, wherein the catalyst comprises octylamine.

5. The method of claim 1, wherein the catalyst comprises butylamine.

6. The method of claim 1, wherein the catalyst comprises methylamine.

7. The method of claim 1, wherein the silane comprises one or more organosilane.

8. The method of claim 1, wherein the silane comprises one or more polysilane.

9. The method of claim 1, wherein the silane comprises disilabutane, tetrasilyl ethylene, tetrasilyl methane, trisilyl methane, silyl acetylene, disilyl acetylene, tert-butyldimethyl silanes, trimethyl silane, or a combination thereof.

10. The method of claim 1, wherein the silane comprises phenylsilane, disilyl benzene, trisilyl benzene, hexasilyl benzene, or a combination thereof.

11. The method of claim 1, wherein the silane is disilabutane.

12. The method of claim 1, wherein the silane is phenylsilane.

13. The method of claim 1, wherein carbon dioxide is not produced.

* * * * *